July 6, 1965

S. C. ELY 3,192,691

GAS, OIL AND WATER SEPARATOR

Filed Nov. 28, 1960

INVENTOR
Spencer C. Ely

BY Cecil L. Wood

ATTORNEY 3,192,691
GAS, OIL AND WATER SEPARATOR
Spencer C. Ely, P.O. Box 333, Jal, N. Mex.
Filed Nov. 28, 1960, Ser. No. 72,118
3 Claims. (Cl. 55—325)

This invention relates to oil, gas and water separators of the type employed in the production and handling of crude oil and natural gas in oil and gas fields, and it has particular reference to apparatus for the removal of water and oil from the gas which is flowed from a well, and the principal object of the invention resides in the provision of a separator unit adapted to be installed at the well, or in flow lines therefrom, to release the gas and separate the oil and water content from the well fluids.

One of the problems in the production of oil and gas is concerned with the usually large quantities of water which constitutes a substantial if not a major portion of the fluids which are flowed or pumped from an oil or gas well, and various methods and apparatus have been employed to remove the water content and liberate the gas from the oil prior to its transmission to the gathering lines, the recovered oil, if any, being directed to storage.

The most effective devices for this purpose known to the industry consist generally of a cylindrical tank, usually installed in a vertical position, and having fluid inlet and outlet openings at the bottom and top of the cylinder, respectively, whereby the well fluids are passed through the device at relatively high velocities, their path being intercepted by a series of baffles, and other impediments, which are designed to release the gas and divest the oil of its heavier water content.

In certain oil and gas producing areas the problem of disposing of the relatively high water content of the well fluids has become critical, resulting in higher production costs with a comparable decrease in profitable gas and oil recovery, necessitating the provision of more effective devices capable of accomplishing the separation function with greater speed and volume and at lesser costs for equipment and maintenance.

A prime object of the invention, therefore, resides in the provision of a separator unit which employs both impingement and centrifugal action in three stages by which a more thorough scrubbing action on the fluids can be accomplished and a more profitable recovery realized with greater economy. An advantage attained by the invention is apparent in the provision of a specially designed receiving element in the unit into which the fluids are first introduced to initiate an upward and centrifugal movement thereof which continues throughout the treatment.

Broadly, the invention contemplates the provision of an oil, water and gas separator which is especially adapted for use in natural gas fields where gas constitutes the major portion of the recoverable products, and where water invariably presents a problem, requiring a vigorous turbulent action by which the gas can be liberated from the liquids, and any remaining condensates removed therefrom.

While the foregoing objects are paramount, other and lesser objects will become manifest as the description proceeds, taken in connection with the appended drawings wherein.

Figure 1:
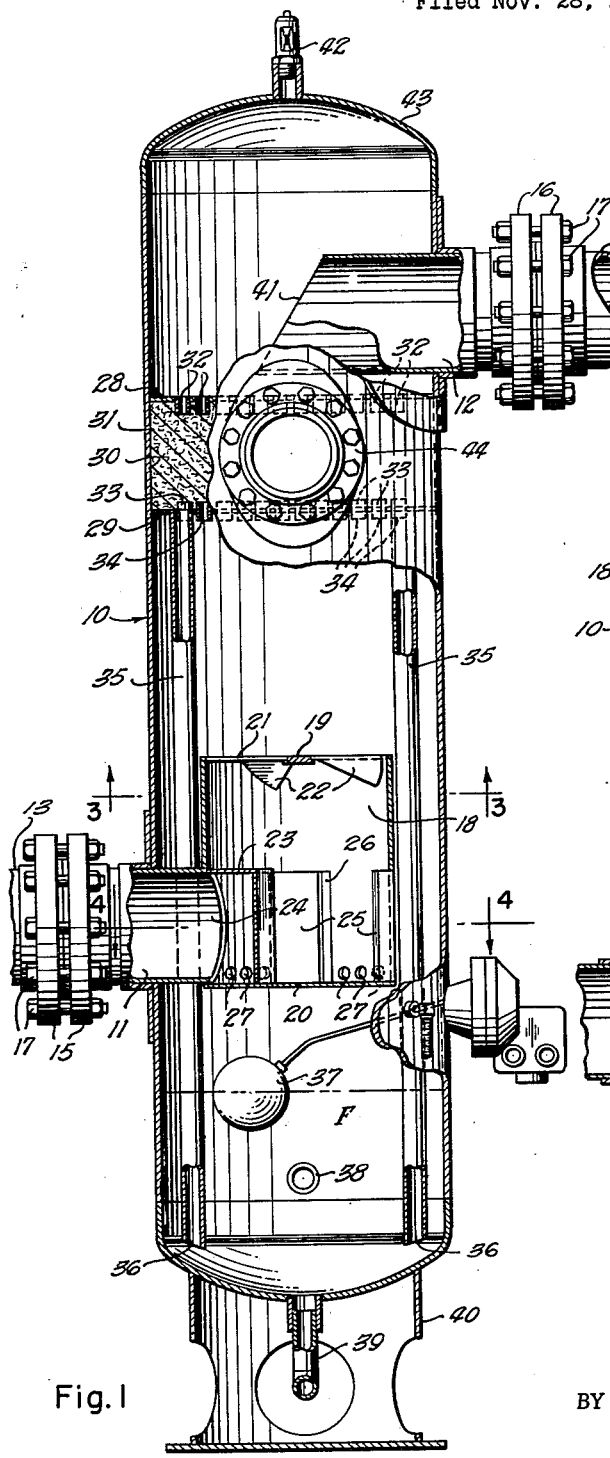
FIGURE 1 is a vertical sectional view of the invention, shown partially in elevation, illustrating the baffling and filtering apparatus, and the float control device.

Referring to the drawing, the vertically disposed cylindrical housing 10 is shown in FIGURE 1 substantially in longitudinal section and has a fluid inlet coupling 11 spaced above its lower end, and a gas outlet coupling 12 near its upper end. Inlet and outlet conduits 13 and 14, respectively, are attached to the couplings 11 and 12 by flanges 15 and 16 and bolts 17.

Figure 3:
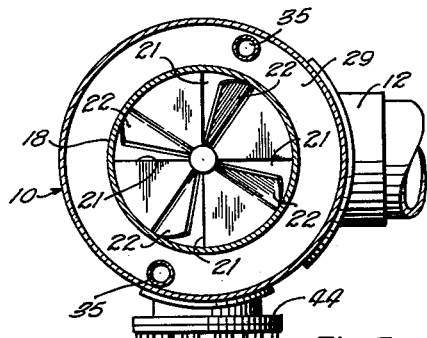
FIGURE 3 is a transverse sectional view, on line 3—3 of FIGURE 1, showing the horizontal radially disposed baffles in the receiving unit.

The inlet coupling 11 extends into the housing 10 and its inner end is connected to the bottom of a cylindrical fluid receiving unit 18 which is supported concentrically of the housing 10 in its lower portion and has top and bottom members 19 and 20. A plurality of radially disposed segmental openings 21 are formed in the top 19 and each has a baffle 22 depending into the unit 18 at an angle and inclined counter-clockwise, as apparent in FIGURE 3.

Figure 2:
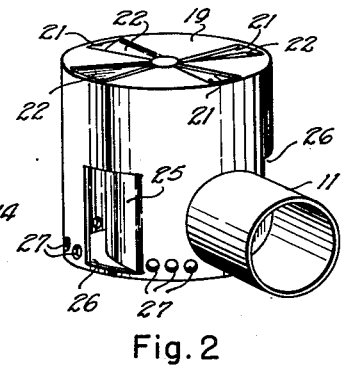
FIGURE 2 is a perspective illustration of the receiving unit embodied in the invention.
Figure 4:
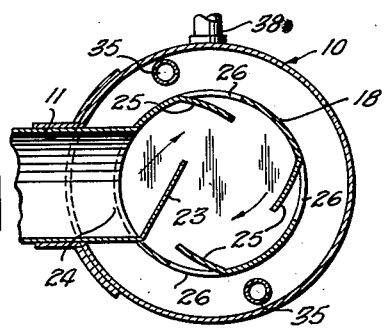
FIGURE 4 is a transverse sectional view, on line 4—4 of FIGURE 1, showing the fluid inlet and showing the tangentially directed vertical baffles in the receiving unit.

A bonnet 23 is secured internally of the unit 18 at the inlet opening 24 to direct the fluid entering the unit 18 in a circular motion, as shown in FIGURES 1, 2 and 4, and into contact with tangentially inclined baffles 25 which are formed with the cylindrical wall of the unit 18 across a plurality of circumferentially spaced vertical openings 26 in the lower portion thereof in the same plane with the inlet opening 24, as illustrated in FIGURES 1 and 2. A series of apertures 27 are spaced about the lower end of the unit 18 and above the bottom 20 thereof.

Spaced above the unit 18, and in the upper portion of the housing 10, is a pair of vertically spaced upper and lower baffle plates 28 and 29, between which is defined a filter compartment 30 containing a filtering material 31, such as Raschig rings or wire mesh. Each of the upper and lower baffle plates 28 and 29 has a plurality of uniformly spaced perforations therein, and each perforation in the upper plate 28 has a pipe nipple welded therein which depends below the plate 28 providing a substantial number of circular baffles 32. The perforations in the lower plate 29 have pipe nipples therein which extend above and below the plate 29 to provide a plurality of circular baffles 33 and 34.

Depending from the lower plate 29, on opposite sides thereof, are drain pipes 35 which are open at their upper ends into the filter compartment 30, their lowermost ends 36 being open to the lower portion of the housing 10, as shown in FIGURE 1, into which the liquid components of the well fluid are drained. The fluid level, indicated by the broken line F, is controlled by a float 37, and is above the lower ends 36 of the drain pipes 35 whereby these elements are sealed against the passage of gas therethrough.

The float 37 is connected to and operates a liquid level dump valve (not shown) in the liquid outlet conduit 38 in the lower portion of the housing 10, as shown in FIGURES 1 and 4. A bottom drain outlet 39 is also shown in FIGURE 1 within the circular base 40 for the housing 10 through which water is drained therefrom.

In operation, the well fluids are flowed at relatively high velocities through the fluid inlet 11 and is directed in a circular path through the bonnet 23 against the tangentially disposed baffles 25. The cyclonic action thus initiated causes the gaseous components to be liberated from the heavier liquids and pass upward in a helical path which motion is further accelerated by the radial baffles 22 in the segmental openings 21 in the top 19 of the unit 18.

The scrubbing action which takes place in the unit 18 precipitates the water and oil content of the well fluids which drain out of the unit 18 through the openings 26 and the apertures 27 into the lower portion of the housing 10. Moisture and oil laden gas is directed upwardly in a whirling motion against the lower plate 29 and is subjected to further scrubbing by the baffles 34 therein as the gas passes through the nipples and the filter material 31 in the compartment 30 where additional liquids are removed to drain back through the pipes 35 to the bottom of the housing 10.

The gas, upon passage through the filter compartment 30, impinges the depending baffles 32 in the top plate 28, further reducing the liquid contents, and thence out through the inner end 41 of the outlet coupling 12, shown in FIGURE 1. The outlet coupling 12 extends inwardly of the housing 10 and well over the top plate 28 to present a further impediment to the movement of the gas resulting in further divestation therefrom of any remaining moisture or oil content. A safety valve 42 is connected in the vortex of the dome-like top 43 of the housing 10. The seal afforded by the liquid in the bottom of the housing 10 prevents the gas from escaping downwardly.

A covered opening 44 is provided in the housing 10 whereby access may be had to the filter compartment 30, as shown in FIGURE 1, and a sight gauge 45 is connected to the lower portion of the housing 10 to visually show the liquid level F therein. The gauge 45 is fragmentarily shown in FIGURE 1.

It becomes apparent, therefore, that the tortuous path which the well fluids are forced to traverse during their passage through the invention will be effective in providing a substantially "dry" gas product which is transmitted to the gathering lines or storage.

While the invention has been described with great particularity as to its structural design and function, it is obvious that certain changes and modifications therein may be resorted to from time to time, by persons skilled in the art, without departing from the spirit and intent of the invention or the scope of the appended claims.

What is claimed is:

1. An oil, water and gas separator having a vertically disposed cylindrical housing and a fluid inlet conduit in the lower portion of said housing and an outlet conduit in the upper portion thereof, a cylindrical fluid receiving element supported concentrically of said housing and having said inlet conduit connected to one side at the bottom thereof, a baffle tangentially disposed across the inlet opening of said inlet conduit in said element directing the fluids in a circular motion therein, a series of vertically elongated circumferentially spaced openings in said element, each having a baffle coextensive therewith extending tangentially into said element in the direction of movement of said fluids for impeding the circular motion of liquids therein, a plurality of radially disposed openings in the top of said element, a baffle for each radial opening depending into said element in a counter-clockwise direction whereby to conduct said fluids clockwise upwardly therein, and a filter chamber having a filtering material therein extending completely across said housing between said element and said outlet conduit whereby to filter out liquids remaining in the fluids prior to their entering said outlet conduit.

2. An oil, water and gas separator as described in claim 1 wherein said fluid receiving unit has a closed bottom and a series of drain apertures arranged circumferentially thereof above said bottom.

3. A separator for oil, water and gas, as described in claim 1, having a plurality of drain pipes communicating with said filter compartment and depending therefrom into said housing below said fluid receiving element.

References Cited by the Examiner
UNITED STATES PATENTS

| | | |
|---|---|---|
| 1,588,861 | 6/26 | Walker. |
| 1,915,436 | 6/33 | Moore et al. |
| 2,082,863 | 6/37 | Weisgerber. |
| 2,788,080 | 4/57 | Guarin. |
| 2,800,196 | 7/57 | Arant. |

REUBEN FRIEDMAN, *Primary Examiner.*

HERBERT L. MARTIN, HARRY B. THORNTON, *Examiners.*